H. RIPPLINGER.
MOLDING MACHINE.
APPLICATION FILED SEPT. 3, 1909.
955,356.
Patented Apr. 19, 1910.
4 SHEETS—SHEET 1.
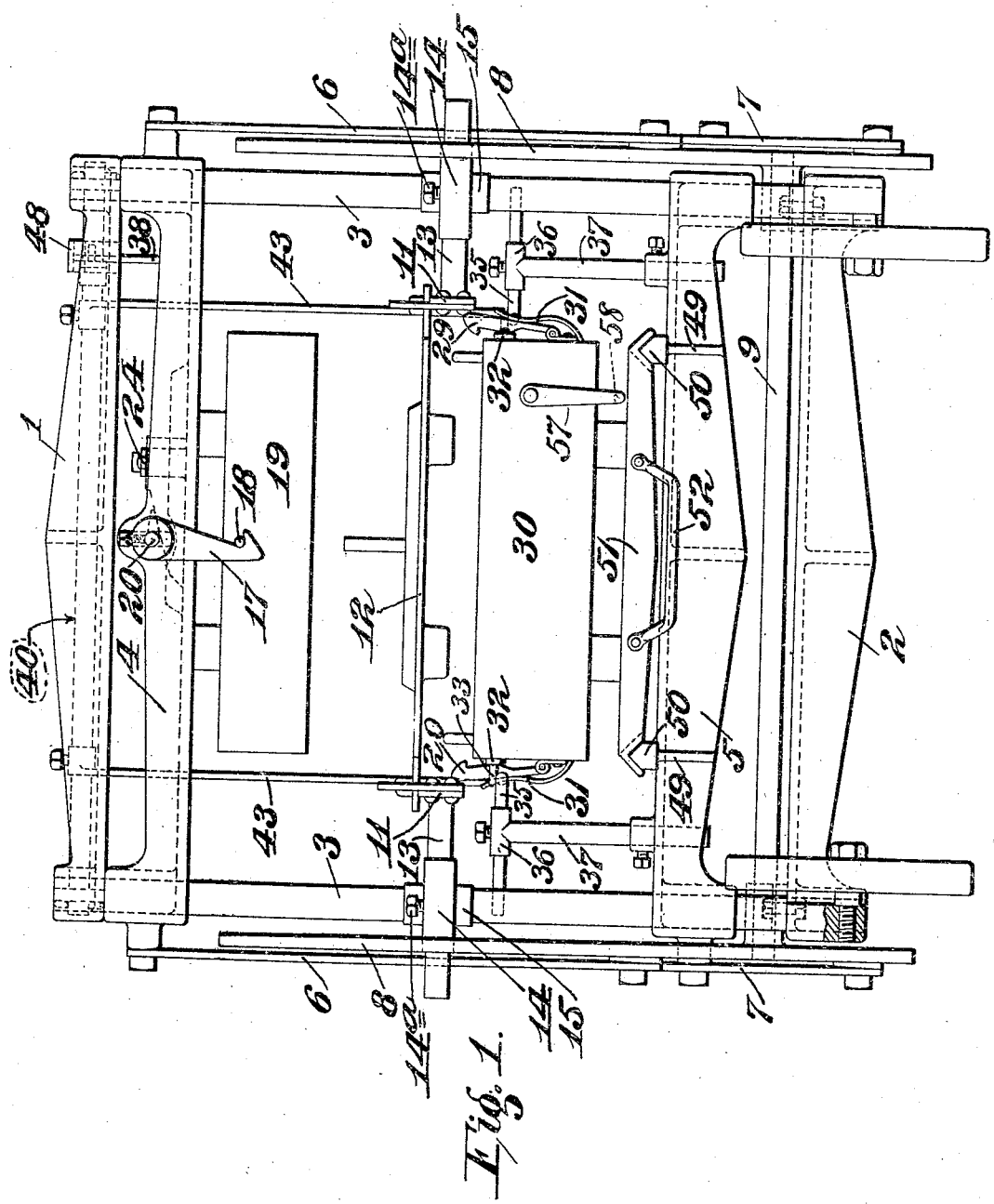
Witnesses:
Edgar T. Farmer
G. A. Pennington
Inventor:
Henry Ripplinger,
By Cann & Cann
Attys.

H. RIPPLINGER.
MOLDING MACHINE.
APPLICATION FILED SEPT. 3, 1909.
955,356.
Patented Apr. 19, 1910.
4 SHEETS—SHEET 2.
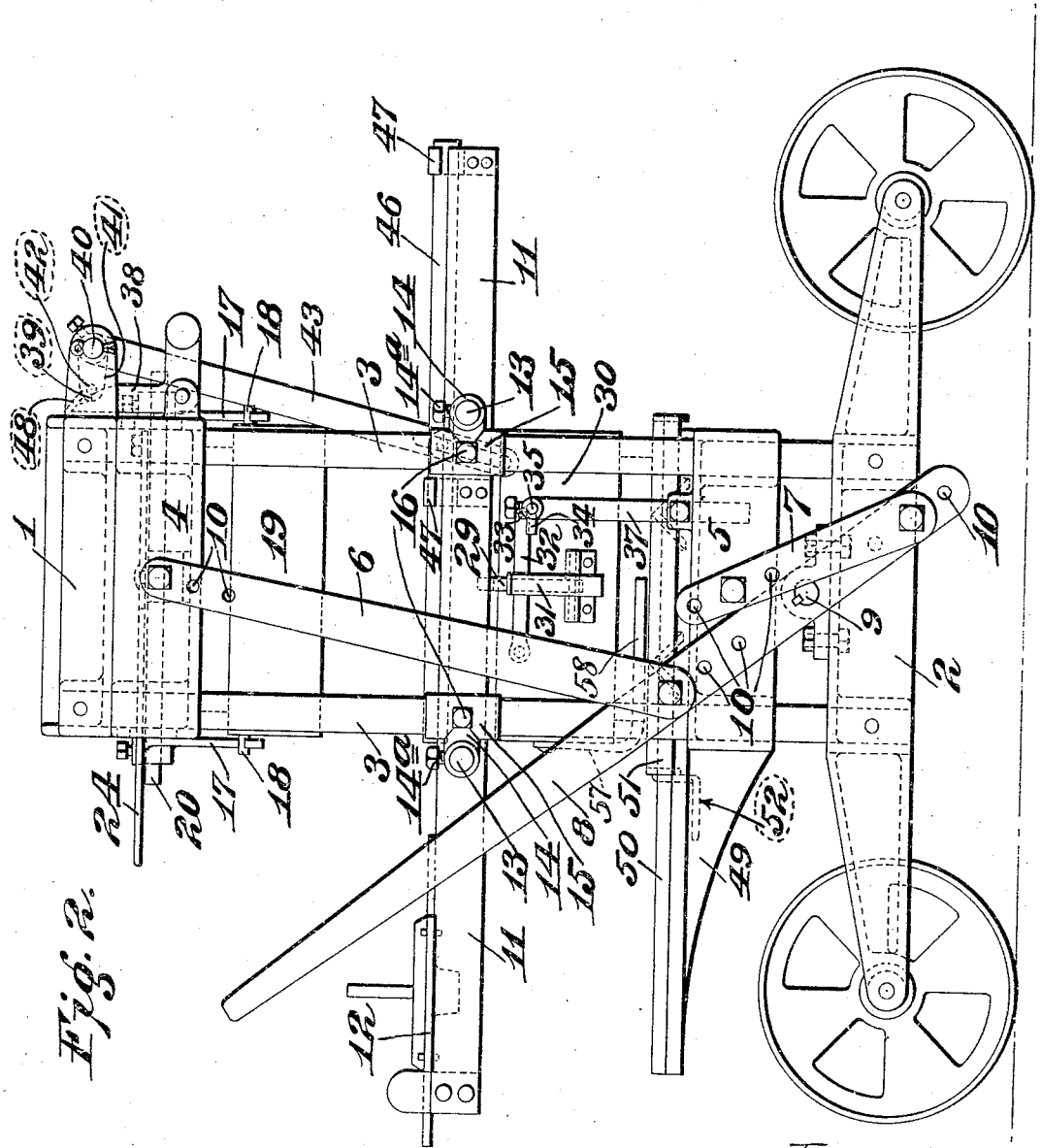
Witnesses:
Edgar T. Farmer.
G. A. Pennington
Inventor:
Henry Ripplinger,
By Cann & Cann,
attys.

H. RIPPLINGER.
MOLDING MACHINE.
APPLICATION FILED SEPT. 3, 1909.
955,356.
Patented Apr. 19, 1910.
4 SHEETS—SHEET 3.
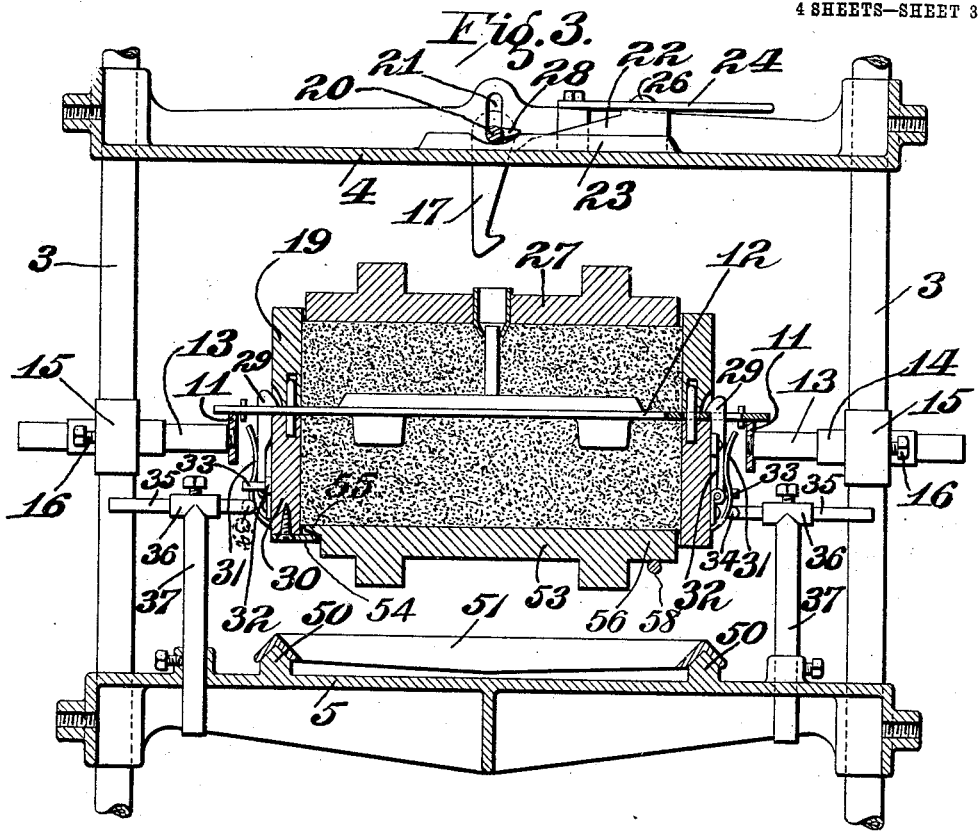
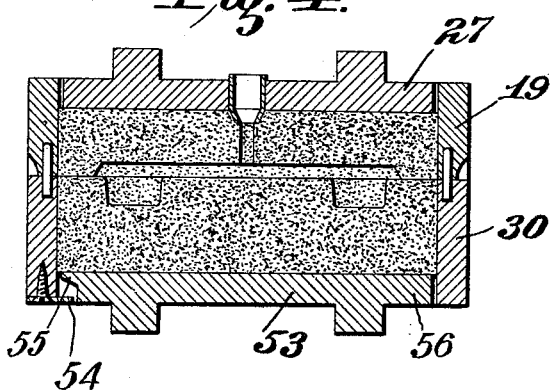
Witnesses:
Edgar T. Farmer
G. A. Pennington
Inventor:
Henry Ripplinger,
By Emmet Carr
attys.

H. RIPPLINGER.
MOLDING MACHINE.
APPLICATION FILED SEPT. 3, 1909.
955,356.
Patented Apr. 19, 1910.
4 SHEETS—SHEET 4.
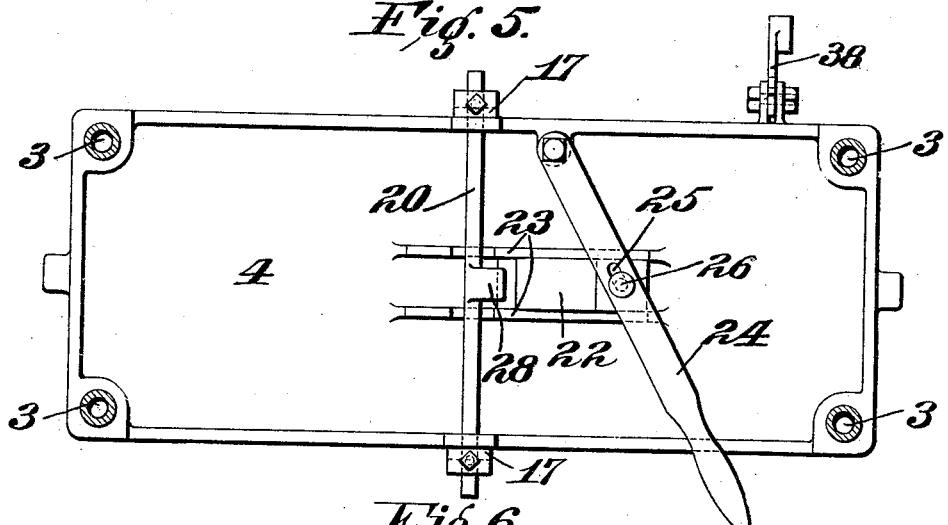
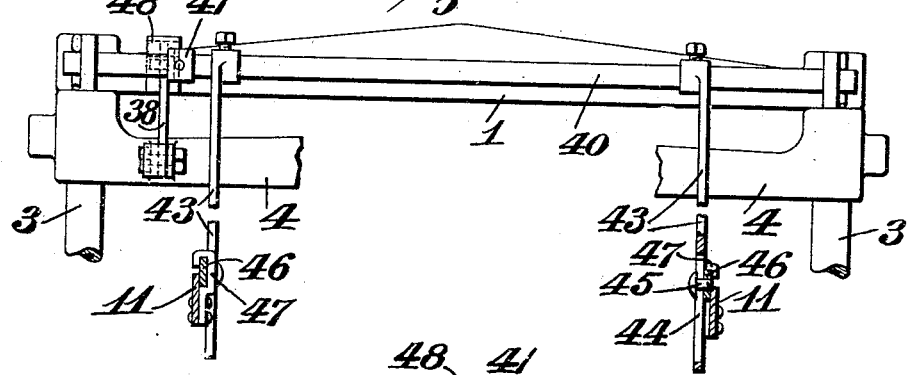
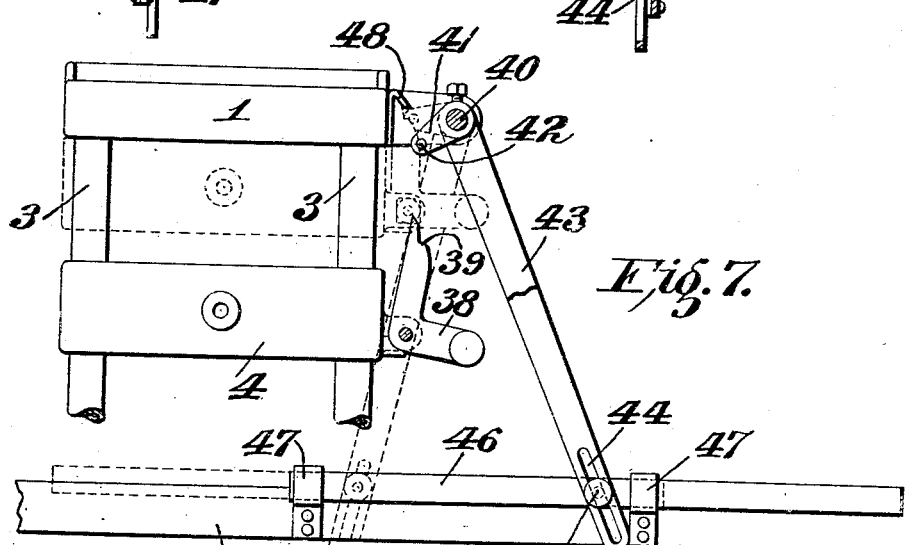
Witnesses:
Edgar T. Farmer
G. A. Pennington
Inventor:
Henry Ripplinger
By Carr & Carr
Attys.

UNITED STATES PATENT OFFICE.

HENRY RIPPLINGER, OF BELLEVILLE, ILLINOIS, ASSIGNOR OF ONE-THIRD TO JOHN F. AUG, OF BELLEVILLE, ILLINOIS.

MOLDING-MACHINE.

955,356. Specification of Letters Patent. Patented Apr. 19, 1910.

Application filed September 3, 1909. Serial No. 516,073.

*To all whom it may concern:*

Be it known that I, HENRY RIPPLINGER, a citizen of the United States, and a resident of Belleville, county of St. Clair, and State of Illinois, have invented a new and useful Improvement in Molding-Machines, of which the following is a specification.

My invention relates to molding machines and has for its principal objects to produce a molding machine of simple construction and of easy operation and whose parts are adjustable to the various requirements of the pattern and of the work.

My invention consists in the construction and arrangements of parts hereinafter described and claimed.

In the accompanying drawing, which forms part of this specification, and wherein like symbols refer to like parts wherever they occur, Figure 1 is a front elevation of my machine; Fig. 2 is a side elevation thereof; Fig. 3 is a cross section of the mold and adjacent portions of the machine in the position prior to compression; Fig. 4 is a cross section of a finished mold; Fig. 5 is a plan view of the upper presser head; Fig. 6 is a rear elevation of parts of the upper portion of the machine, the trackways being shown in section; and, Fig. 7 is a side elevation of the match-plate ejecting mechanism.

My machine comprises a framework 1 which is preferably mounted upon a wheeled base or truck 2 to facilitate moving it about the foundry. The uprights 3 of the frame are preferably tubular and constitute guideways for vertically movable upper and lower presser-heads 4, 5. Each of these presser-heads is connected at its ends by pivotal links 6, 7 to manually operable levers 8 fixed on a horizontal shaft 9 journaled in the base of the machine. In order to regulate the limits of the stroke of said presser heads and properly proportion the pressures on the cope and on the drag, respectively, either the effective lengths of the links or their points of attachment to the levers are varied. A convenient device for this purpose is to provide the links 6, 7 and the hand levers 8 with a series of bolt holes 10, the bolts which fasten the links to the levers being shifted to suit the requirements of any particular case.

Supported upon uprights 3 are horizontal trackways 11 adapted to support a match-plate 12 between the upper and the lower presser-heads. These trackways are mounted on transverse horizontal bars or tubes 13 which extend through tubular housings 14 provided therefor on the uprights. By shifting these horizontal bars endwise, that is, transversely of the machine, the trackways may be adjusted to any desired width and to any position crosswise of the machine. Set screws 14ª are provided on said housings 14 to hold said trackways wherever adjusted. Likewise, in order to secure a vertical adjustment of the trackways, their horizontal housings 14 are themselves mounted upon housings 15 which are movable vertically of the uprights. These vertically movable housings are likewise held at any desired elevation by means of set screws 16 provided for the purpose.

The upper presser head is provided with depending hooks 17 in position to coöperate with pins or lugs 18 provided for the purpose on the cope 19 of the mold. These hooks are pivotally mounted so that they normally assume a nearly vertical position through gravity; but when they are lowered against the pins on the sides of the cope, said hooks are turned aside and then swing back and engage underneath the pins. These hooks are mounted upon a cross bar or member 20 which is mounted in vertical guideways 21 and rests upon a wedge block 22 which is movable in horizontal guideways 23 provided therefor on the upper presser head 4. A convenient means for actuating said wedge block consists of a lever 24 pivotally mounted on said presser head and provided in its intermediate portion with an elongated slot 25 through which passes a pin or lug 26 provided therefor on the wedge block. When the hooks interlock with the cope pins, the manipulation of this lever serves to raise the cope until the follower plate 27 thereon bears firmly against the upper presser head, whereby the cope is protected from jarring. Instead of relying entirely upon gravity to swing the hooks into engagement with the pins on the cope, it is preferable to equip the cross bar with a rock arm 28 in position to be raised by the wedge during the first part of its stroke so as to positively turn or rock said cross bar. In such case, the hooks are fastened to the cross bar to turn therewith, but are adjustable lengthwise of said cross bar in order to coöperate with copes of different widths.

The match plate 12 has holes in its end portions through which project latches 29 which are pivotally mounted on the drag 30, and are normally held in interlocking engagement with said match plate by springs 31. The inner edges of said latches are inclined. Intervening between each latch and the body of the drag is a lever 32 which is pivotally mounted on the drag to move in a vertical plane and the free end of said lever is provided with a pin 33 or is otherwise adapted to be actuated by a member 34 movable with the lower presser-head. As illustrated in the drawing, such member is merely a pin 34 mounted on a rod 35 which is adjusted in a horizontal housing 36, the housing itself being mounted upon a vertical rod or tube 37 which is supported on the lower presser-head so as to be vertically adjustable thereon. Thus, the mechanism for tripping and disengaging the drag from the match-plate may be adjusted both vertically and horizontally.

In order to remove the match plate out of alinement with the presser-heads and thus permit the cope and the drag to come together, the following device is provided. A counterweighted bell crank 38 is mounted on the upper presser head 4, and the upwardly extending arm of said lever is beveled off and provided with a shoulder 39. Journaled on the upper cross head is a horizontal rock shaft 40 whose short arm 41 is provided with a pin 42 which lies normally in the path of the beveled portion of said bell crank lever. This rock shaft is provided with long arms 43 extending downwardly below the trackways 11 and provided with elongated longitudinal slots 44 therein. Through these slots extend pins 45 which are mounted upon slides 46 which work in guideways 47 provided therefor on the trackways 11. Said arms 43 are adjustable longitudinally of the rock shaft to conform to the adjustment of the trackways. That is, the arms 43 are preferably provided with sleeve portions at their upper ends which are slidably fitted over the shaft 40 and secured in adjusted positions by set-screws as shown more clearly in Fig. 6. The upper presser head is provided with a guard or keeper 48 into which the upper end of the bell crank lever is guided during the latter part of its upward stroke. By this arrangement, the upward movement of the upper presser head causes the beveled end of the bell crank lever to bear against the pin on the short arm of the rock lever, whereby the arm of the bell crank lever is guided underneath the keeper. As the upward movement of the presser head continues, the shoulder on the bell crank lever bears against the pin on the rock arm causing the oscillation of the rock shaft and of the long arms mounted thereon. The movement of these long arms is transmitted to the slides, which in turn bear against the match plate and push or eject it forwardly out of alinement with the presser-head. When the upper presser-head has reached the limit of its upward movement, the beveled end of the bell crank lever has moved underneath the keeper and the shoulder on the bell crank lever is released from under the pin on the short arm on the rock-shaft which carries the long arms of the ejector mechanism. The slides which eject the match-plate are then free to be moved back into normal position without necessitating the lowering of the upper presser-head.

Mounted on the lower presser head 5 of the frame and on a bracket 49 extending forwardly therefrom are beveled trackways 50; and on these trackways is a slide 51 which is provided with V-shaped grooves fitting over said trackways. This slide 51 is provided with a handle 52 for manipulating it and constitutes a convenient support for the finished mold.

The operation of my machine is as follows: The match plate is laid on the upper trackways 11 in an inverted position and the drag is placed on and secured to said match plate and is then filled with sand, and provided with a follower plate 53 which is locked so as to remain in position when the drag is inverted. The locking of the follower is preferably effected by providing an inwardly overhanging plate or ledge 54 on the edge portion of one end wall of the drag 30 and rabbeting one end 55 of the follower plate 53 so that it can fit under said plate or ledge 54 on the drag. The opposite end portion 56 of the follower plate 53 is held by a member 57 hinged on the outer side of the side wall of the drag and having a laterally bent end portion 58 which projects over the outer face of the follower plate. The match plate with the drag secured thereto is then inverted and placed on the upper trackways 11. The cope is then applied, filled with sand and provided with a follower plate 27, and then the entire mold is shifted into vertical alinement with the presser-heads. The main hand lever or levers 8 are then actuated, causing the presser-heads to bear against the respective follower plates and thereby compress the sand in the mold. The downward movement of the upper presser head causes the hooks thereon to first swing aside and then underneath the cope pins. Thereupon the hand lever 24 is manipulated to raise said hooks and thereby clamp the follower plate and the cope firmly against the upper presser-head. The upward movement of the lower presser-head causes the tripper pins 34 to bear against the spring latches on the drag and thereby disengage the drag from the match plate. When the movement of the main actuating levers 8 is reversed, the upper presser-head rises carrying with it the cope, and the lower presser head goes down carrying with it the drag; in the meanwhile, the match plate remains on the trackways 11 until the upward movement of the upper presser head carries its counterweighted bell crank lever against the pin 42 on the short arm of the rock shaft 40, whereupon the rock-shaft is rocked and the long arms 43 thereon move the ejector bars or slides horizontally to bear the match plate endwise of the trackways and out of the path of the presser-heads. Thereupon, the hand lever is operated to move the presser heads toward each other, whereby the cope and the drag are brought together, thereby finishing the mold.

It is noted that the two presser-heads move simultaneously; but, as the match plate is supported by the trackways during the operation of the presser-heads, it is possible to compress the sand in the cope to a greater extent than the sand in the drag. For this purpose, the height of the trackways and the strokes of the respective presser-heads are adjusted as hereinbefore described.

Obviously, my device admits of considerable modification without departing from my invention, and therefore I do not wish to be limited to the specific construction and arrangement hereinbefore described.

What I claim is:

1. A molding machine comprising a frame, presser-heads movably mounted in said frame, means for supporting a match plate between said presser-heads, a match-plate adapted to support the drag, means for securing the drag to said match-plate, and means for disengaging said match plate from the drag of the mold, said means comprising members movable with the lower presser-head in position to coöperate with a part of said means which secures said match plate to the drag.

2. A molding machine comprising a frame, presser-heads movably mounted in said frame, means for supporting a match plate between said presser-heads, a match-plate adapted to support the drag of the mold, means on said drag adapted to engage said match-plate, and means for automatically disengaging said match plate from the drag of the mold, said last-mentioned means comprising members adjustably mounted on the lower presser-head and arranged to coöperate with the securing means on said drag.

3. A molding machine comprising a frame, presser-heads movably mounted in said frame, means for supporting a match plate between said presser-heads, a match plate adapted to support the drag of the mold, a catch on said drag arranged to engage said match-plate, means for disengaging said match plate from the drag of the mold, said disengaging means comprising members adjustably mounted on the lower presser head in position to disengage the catch which locks said match plate to the drag, and means for shifting said match plate from between said presser heads.

4. The combination with a molding machine comprising a frame, presser heads movably mounted in said frame and means for supporting a match plate between said presser-heads, of a match plate mounted on said support and having holes therethrough and a drag having spring latches interlocking with said holes, the lower presser-head having members thereon arranged to bear said latches out of engagement with said holes when said lower presser head is raised.

5. The combination with a molding machine comprising a frame, presser-heads movably mounted in said frame and means for supporting a match plate between said presser-heads, of a match plate mounted on said support and having holes therethrough and a drag having spring latches interlocking with said holes, the lower presser-head having members thereon arranged to bear said latches out of engagement with said holes when said lower presser-head is raised, said members being adjustable vertically.

6. The combination with a molding machine comprising a frame, presser-heads movably mounted in said frame and means for supporting a match plate between said presser-heads, of a match plate mounted on said support and having holes therethrough and a drag having spring latches interlocking with said holes, the lower presser-head having members thereon arranged to bear said latches out of engagement with said holes when said lower presser-head is raised, said members being adjustable vertically and laterally.

7. A molding machine comprising a frame, presser-heads movably mounted in said frame, and horizontal trackways adapted to support a match plate between said presser-heads, and a reciprocatable slide arranged to move said pattern along said track, and means mounted on the upper presser-head for actuating said slide.

8. A molding machine comprising a frame, presser-heads movably mounted in said frame, and horizontal trackways adapted to support a match plate between said presser-heads, and a reciprocatable slide arranged to move said match plate along said track, and means mounted on the upper presser-head for actuating said bar, said means comprising a rock shaft, a counterweighted bell-crank on said upper presser-head in position to bear against one arm of said rock shaft, the other arm of said rock shaft having an elongated slot coöperating with a pin on said slide.

9. A molding machine comprising a frame, presser-heads movably mounted in said frame, and trackways adapted to support a match plate between said presserheads, said trackways being adjustable vertically.

10. A molding machine comprising a frame, presser-heads movably mounted in said frame, and trackways adapted to support a match plate between said presser heads, said trackways being adjustable as to width.

11. A molding machine comprising a frame, presser-heads movably mounted in said frame, and trackways adapted to support a match plate between said presserheads, said trackways being adjustable vertically and for width.

12. A molding machine comprising a frame having uprights, presser-heads movably mounted in said frame, housings vertically movable on said uprights, horizontal bars adjustably mounted on said housings and trackways on said bars adapted to support a match plate between said presserheads.

13. A molding machine comprising a frame, presser-heads movably mounted on said frame, means for supporting a matchplate between said presser-heads and means for actuating said presser-heads, said means comprising a manually operable lever and links pivotally connected to said lever and to the respective presser-heads, and means whereby the cope may be pressed harder than the drag.

14. A molding machine comprising a frame, presser-heads movably mounted on said frame, means for supporting a match plate between said presser-heads and means for actuating said presser-heads, said means comprising a manually operable lever and links pivotally connected to said lever and to the respective presser heads, and means for varying the point of connection between said lever and said links.

15. A molding machine comprising a frame, presser-heads movably mounted in said frame, and means for supporting a match plate between said presser-heads, the upper presser-head having hooks depending therefrom in position to engage coöperating elements provided therefor on the cope of the mold, said hooks being mounted to move vertically on said upper presser-head, and means on said upper presser-head for lifting said hooks.

16. A molding machine comprising a frame, presser-heads movably mounted in said frame, and means for supporting a match plate between said presser-heads, the upper presser-head having a vertically movable bar provided with gravity hooks in position to engage coöperating elements provided therefor on the cope of the mold, and a wedge block movable under said bar to raise the same.

17. A molding machine comprising a frame, presser-heads movably mounted in said frame, and means for supporting a match plate between said presser-heads, the upper presser-head having a vertically movable bar provided with gravity hooks in position to engage coöperating elements provided therefor on the cope of the mold, and a manually operable wedge block movable under said bar to raise the same.

Signed at Belleville, Illinois, this 25th day of August, 1909.

HENRY RIPPLINGER.

Witnesses:
F. W. BEIMECKE,
EDMUND BURKE.